(12) United States Patent
Wang et al.

(10) Patent No.: US 7,601,680 B2
(45) Date of Patent: Oct. 13, 2009

(54) GEMINI SILICONE SURFACTANT COMPOSITIONS AND ASSOCIATED METHODS

(75) Inventors: Dong Wang, Shanghai (CN); Wenqing Peng, Shanghai (CN)

(73) Assignee: Momentive Performance Materials, Albany, NY (US)

( * ) Notice: Subject to any disclaimer, the term of this patent is extended or adjusted under 35 U.S.C. 154(b) by 591 days.

(21) Appl. No.: 11/302,551

(22) Filed: Dec. 13, 2005

(65) Prior Publication Data

US 2007/0135329 A1 Jun. 14, 2007

(51) Int. Cl.
*C11D 1/82* (2006.01)

(52) U.S. Cl. .................. 510/466; 510/119; 510/122; 510/130; 510/136; 510/343; 510/347; 510/413; 510/421

(58) Field of Classification Search .................. 510/119, 510/122, 130, 136, 343, 347, 413, 421, 466
See application file for complete search history.

(56) References Cited

U.S. PATENT DOCUMENTS

| | | | |
|---|---|---|---|
| 5,026,891 A | 6/1991 | Colas et al. | |
| 5,401,871 A | 3/1995 | Feldmann-Krane et al. | |
| 5,430,166 A | 7/1995 | Klein et al. | |
| 5,430,167 A | 7/1995 | Klein et al. | |
| 6,235,681 B1 | 5/2001 | Policello | |
| 6,238,684 B1 * | 5/2001 | Policello | 424/405 |
| 6,255,511 B1 | 7/2001 | Klein et al. | |
| 6,300,283 B1 * | 10/2001 | Sakuta | 504/362 |
| 6,489,498 B2 | 12/2002 | Klein et al. | |
| 6,593,274 B2 | 7/2003 | Policello | |
| 6,673,359 B2 | 1/2004 | Policello | |
| 6,734,141 B2 | 5/2004 | Humble et al. | |

FOREIGN PATENT DOCUMENTS

| | | |
|---|---|---|
| EP | 0 710 500 | 11/2000 |
| EP | 1 117 727 | 7/2004 |
| GB | 1 520 421 | 8/1978 |
| WO | WO 97/23281 | 7/1997 |

OTHER PUBLICATIONS

Han et al, New family of Gemini surfactants with glucosamide-based trisiloxane, Jan. 2004, vol. 237 pp. 79-85.*

R. Wagner et al., "Silicon-Modified Carbohydrate Surfactants VII: Impact of Different Silicon Substructures on the Wetting Behaviour of Carbohydrate Surfactants on Low-Energy Surfaces —Distance Decay of Donor-Acceptor Forces", Applied Organometallic Chemistry, vol. 12, pp. 265-276, 1998.

R. Wagner et al., "Silicon-Modified Carbohydrate Surfactants V: The Wetting Behaviour of Low-Molecular-Weight Siloxane, Carbosilane, Silane and Polysilane Precursors on Low-Energy Surfaces", Applied Organometallic Chemistry, vol. 11, pp. 245-657, 1997.

Co-Pending U.S. Appl. No. 60/726,409, filed on Oct. 13, 2005, entitled "Hydrolysis Resistant Organomodified Disiloxane Surfactants".

Co-Pending U.S. Appl. No. 11/300,100, filed on Dec. 13, 2005, entitled "Hydrolysis Resistant Organomodified Disiloxane Surfactants".

Co-Pending U.S. Appl. No. 11/301,707, filed on Dec. 13, 2005, entitled "Extreme Environment Surfactant Compositions Comprising Hydrolysis Resistant Organomodified Disiloxane Surfactants".

Fu Han et al., "New Family of Gemini Surfactants with Glucosamide-Based Trisiloxane", Elsevier, Colloids and Surfaces A: Physicochem. Eng. Aspects, vol. 237, pp. 79-85, 2004.

Yi-Yeol Lyu et al., "Highly Stable Mesoporous Metal Oxides Using Nano-Propping Hybrid Gemini Surfactants", J. American Chemical Society, vol. 126, pp. 3210-2311, 2004.

Fredric M. Menger et al., "Gemini Surfactants", Angew. Chem. Int. Ed., vol. 39, pp. 1906-1920, 2000.

F. M. Menger et al., "Gemini Surfactants: A New Class of Self-Assembling Molecules", J. American Chemical Society, vol. 115, pp. 10083-10090, 1993.

Co-Pending Patent Application, entitled "Surfactant-Based Composition and Associated Methods", 2005.

* cited by examiner

*Primary Examiner*—Charles I Boyer
(74) *Attorney, Agent, or Firm*—Kenneth S. Wheelock; Shawn McClintic

(57) ABSTRACT

A composition having a first hydrophobic moiety linked to a spacer, which is linked to a second hydrophobic moiety to form a Gemini surfactant is provided. Each hydrophobic moiety of the foregoing composition may include silicon. A method for linking a first hydrophobic moiety to a second hydrophobic moiety using a spacer to form a Gemini surfactant is provided. A pesticide having an active ingredient and a composition having a first hydrophobic moiety linked to a spacer, which is linked to a second hydrophobic moiety to form a Gemini surfactant is also provided.

1 Claim, No Drawings

GEMINI SILICONE SURFACTANT COMPOSITIONS AND ASSOCIATED METHODS

BACKGROUND

The invention includes embodiments that relate to a composition having a first hydrophobic moiety linked to a spacer, which is linked to a second hydrophobic moiety to form a Gemini surfactant. The invention includes embodiments that relate to method of making and using the Gemini surfactant composition.

Organosilicone compounds may be useful because of their unique wetting properties. These organosilicone compounds may provide surface tension values lower than other commonly used surfactants. A trisiloxane ethoxylate-based surfactant (TSE) may be one example of an organosilicone surfactant that may be used as agricultural adjuvants. These surfactants may have the property of "super-spreading" that is the ability of a drop of the mixture to spread to a diameter greater than a drop of distilled water on a hydrophobic surface.

TSE surfactants may have reduced super-spreading if the degree of ethoxylation exceeds about 12 EO units. TSE's containing the higher EO adducts may show spreading properties similar to conventional nonsilicone surfactants.

Conventional trisiloxane-based surfactants may have poor hydrolytic stability and may be easily hydrolyzed under acidic or basic conditions. Structural modifications to increase the hydrolytic stability of the trisiloxane-based surfactants may result in poor spreading properties. It may be desirable to have a hydrolytically stable surfactant that shows relatively improved super-spreading performance and adjuvant properties. It may be desirable to have a surfactant with properties other than those currently available for varied applications.

BRIEF DESCRIPTION

In one embodiment, the invention provides a composition having a first hydrophobic moiety linked to a spacer, which is linked to a second hydrophobic moiety to form a Gemini surfactant, wherein each hydrophobic moiety comprises silicon.

In one embodiment, the invention provides a method for linking a first hydrophobic moiety to a second hydrophobic moiety using a spacer to form a Gemini surfactant, wherein each hydrophobic moiety comprises silicon.

DETAILED DESCRIPTION

The invention includes embodiments that relate to a composition having a first hydrophobic moiety linked to a spacer, which is linked to a second hydrophobic moiety to form a Gemini surfactant, such that the first hydrophobic moiety and the second hydrophobic moiety may include silicon. Gemini surfactants are surfactants having two or more hydrophobic groups and at least one hydrophilic group attached to hydrophobic portions in the molecule.

In the following specification and the claims which follow, reference will be made to a number of terms have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value.

A composition is provided that may have a first hydrophobic moiety linked to a spacer, which is linked to a second hydrophobic moiety, to form a Gemini surfactant. In one embodiment, the spacer may include a hydrophilic moiety. Suitable hydrophilic moieties may include one or more of a cationic group, an anionic group, a polar nonionic group, or an amphoteric group. Suitable cationic groups may include, but are not limited to, ammonium groups or positively charged peptide groups. Suitable anionic groups may include, but are not limited to, carboxylic acid groups, sulfonic acid groups, sulfuric acid groups, sulfinic acid groups, phosphonic acid groups, boronic acid groups, fatty acid groups, or negatively charged peptide groups. Suitable polar non-ionic groups may include, but are not limited to, fatty acid ester groups, carbohydrate groups, or polyether and its derivatives. Suitable amphoteric groups may include, but are not limited to, peptide groups. In one embodiment, a cationic group (for example an ammonium group) and an anionic group (for example a phosphate group) may be present in the spacer to form an amphoteric surfactant.

The terms anionic group and cationic group may encompass both protonated and deprotonated forms of the anionic and the cationic groups. For example, when the anionic group is described as a "carboxylic acid group", and both the protonated form of the carboxylic acid ($CO_2H$) and deprotonated form of the carboxylic acid ($CO_2^-$) may be included within the meaning of the term "carboxylic acid group". Thus, the cationic group and the anionic group may include salts of carboxylic acid group, a sulfonic acid group, a sulfuric acid group, a sulfinic acid group, a phosphoric acid group, a boronic acid group, or a fatty acid group.

A suitable hydrophilic moiety of the spacer may include one or more of an ammonium group, a carboxylic acid group, a sulfonic acid group, a sulfuric acid group, a sulfinic acid group, a phosphonic acid group, a boronic acid group, a fatty acid group, a fatty acid ester group, a peptide group, a carbohydrate group, or a polyether. In one embodiment, the hydrophilic moiety of the spacer may be a nonionic polar group including one or more of a peptide group, a carbohydrate group, or a polyether.

A peptide group for the spacer may have a linear sequence of amino acids connected one to the other by peptide bonds between the alpha amino and carboxyl groups of adjacent amino acids. The amino acids may be the standard amino acids or some other non standard amino acids. Some of the standard nonpolar (hydrophobic) amino acids include alanine (Ala), leucine (Leu), isoleucine (Ile), valine (Val), proline (Pro), phenylalanine (Phe), tryptophan (Trp) and methionine (Met). The polar neutral amino acids include glycine (Gly), serine (Ser), threonine (Thr), cysteine (Cys), tyrosine (Tyr), asparagine (Asn) and glutamine (Gln). The positively charged (basic) amino acids include arginine (Arg), lysine (Lys) and histidine (His). The negatively charged (acidic) amino acids include aspartic acid (Asp) and glutamic acid (Glu). The non standard amino acids may be formed in body, for example by posttranslational modification, some examples of such amino acids being selenocysteine and pyrolysine. The peptides may be of a variety of lengths, either in their neutral (uncharged) form or in forms such as their salts. The peptides may be either free of modifications such as glycosylations, side chain oxidation or phosphorylation or comprising such modifications. Substitutes for an amino acid within the sequence may also be selected from other members of the class to which the amino acid belongs. A suitable peptide group may also include peptides modified by additional substituents attached to the amino side chains, such as glycosyl units, lipids or inorganic ions such as phosphates as well as chemical modifications of the chains. Thus, the term "peptide" or its equivalent may be intended to include the appropriate amino acid sequence referenced, subject to the foregoing modifications, which do not destroy its functionality.

A carbohydrate group for the spacer may be a polyhydroxy aldehyde or ketone, or a compound that can be derived from them by any of several means including (1) reduction to give sugar alcohols; (2) oxidation to give sugar acids; (3) substitution of one or more of the hydroxyl groups by various chemical groups, for example, hydrogen may be substituted to give deoxysugars, and amino group ($NH_2$ or acetyl-NH) may be substituted to give amino sugars; (4) derivatization of the hydroxyl groups by various moieties, for example, phosphoric acid to give phosphor sugars, or sulphuric acid to give sulfo sugars, or reaction of the hydroxyl groups with alcohols to give monosaccharides, disaccharides, oligosaccharides, and polysaccharides. Carbohydrate group may include monosaccharides, disaccharides, or oligosaccharides. Suitable monosachharides may include, but are not limited to, glucose, fructose, mannose and galactose. A disachharide, as further defined herein, is a compound, which upon hydrolysis yields two molecules of a monosachharide. Suitable disachharides may include, but are not limited to, lactose, maltose, isomaltose, trehalose, maltulose, and sucrose. Suitable oligosachharides may include, but are not limited to, raffinose and acarbose. Also included are the sachharides modified by additional substituents, for example, methyl glycosides, N-acetyl-glucosamine, N-acetyl-galactosamine and their de-acetylated forms.

A polyether group for the spacer may have structure of formula (I).

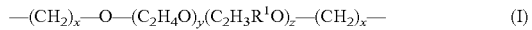

—$(CH_2)_x$—O—$(C_2H_4O)_y(C_2H_3R^1O)_z$—$(CH_2)_x$— (I)

wherein "x" is independently at each occurrence an integer from 1 to 6, "y" and "z" are independently integers from 0 to 12, with the proviso that y+z is less than or equal to 12, and $R^1$ is a $C_1$-$C_{10}$ aliphatic radical. The alkyleneoxide polymers included in structure (I) may have a broad molecular weight distribution and the indices "y" and "z" stated above designate the average composition only. In one embodiment, the molecular weight distribution of alkyleneoxide polymers may be less than about 1.2. The distribution of the different alkyleneoxide units may be random or in blocks.

Aliphatic radical is an organic radical having at least one carbon atom, a valence of at least one and may be a linear or branched array of atoms. Aliphatic radicals may include heteroatoms such as nitrogen, sulfur, silicon, selenium and oxygen or may be composed exclusively of carbon and hydrogen. Aliphatic radical may include a wide range of functional groups such as alkyl groups, alkenyl groups, alkynyl groups, halo alkyl groups, conjugated dienyl groups, alcohol groups, ether groups, aldehyde groups, ketone groups, carboxylic acid groups, acyl groups (for example, carboxylic acid derivatives such as esters and amides), amine groups, nitro groups and the like. For example, the 4-methylpent-1-yl radical is a $C_6$ aliphatic radical comprising a methyl group, the methyl group being a functional group, which is an alkyl group. Similarly, the 4-nitrobut-1-yl group is a $C_4$ aliphatic radical comprising a nitro group, the nitro group being a functional group. An aliphatic radical may be a haloalkyl group that includes one or more halogen atoms, which may be the same or different. Halogen atoms include, for example; fluorine, chlorine, bromine, and iodine. Aliphatic radicals having one or more halogen atoms include the alkyl halides: trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g., —$CH_2CHBrCH_2$—), and the like. Further examples of aliphatic radicals include allyl, aminocarbonyl (—$CONH_2$), carbonyl, dicyanoisopropylidene —$CH_2C(CN)_2CH_2$—), methyl (—$CH_3$), methylene (—$CH_2$—), ethyl, ethylene, formyl (—CHO), hexyl, hexamethylene, hydroxymethyl (—$CH_2OH$), mercaptomethyl (—$CH_2SH$), methylthio (—$SCH_3$), methylthiomethyl (—$CH_2SCH_3$), methoxy, methoxycarbonyl ($CH_3OCO$—), nitromethyl (—$CH_2NO_2$), thiocarbonyl, trimethylsilyl (($CH_3)_3Si$—), t-butyldimethylsilyl, trimethoxysilylpropyl (($CH_3O)_3SiCH_2CH_2CH_2$—), vinyl, vinylidene, and the like. By way of further example, a "$C_1$-$C_{30}$ aliphatic radical" contains at least one but no more than 30 carbon atoms. A methyl group ($CH_3$—) is an example of a $C_1$, aliphatic radical. A decyl group ($CH_3(CH_2)_9$—) is an example of a $C_{10}$ aliphatic radical.

In one embodiment, the spacer may include a polyether having structure of formula (II).

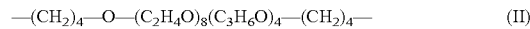

—$(CH_2)_4$—O—$(C_2H_4O)_8(C_3H_6O)_4$—$(CH_2)_4$— (II)

Structure (II) falls within generic formula (I) and represents the case where "x" in structure (I) is 4, "y" in structure (I) is 8, "z" in structure (I) is 4, and $R^1$ is a methyl radical. In another embodiment, the spacer may include a polyether having structure of formula (III).

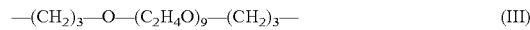

—$(CH_2)_3$—O—$(C_2H_4O)_9$—$(CH_2)_3$— (III)

Structure (III) falls within generic formula (I) and represents the case where "x" in structure (I) is 3, "y" in structure (I) is 9, and "z" in structure (I) is 0.

In one embodiment, the first hydrophobic moiety and the second hydrophobic moiety of the Gemini surfactant may include one or more organosiloxane groups or organosilane groups. The first hydrophobic group and the second hydrophobic group may be same on either side of the spacer or different.

Suitable organosiloxane groups may have a structure of formula (IV) or (V):

$(R^2R^3R^4SiO_{1/2})_2(R^5R^6SiO_{2/2})_a(R^7SiO_{2/2})$— (IV)

$(R^8R^9R^{10}SiO_{1/2})(R^{11}R^{12}SiO_{2/2})_b(R^{13}R^{14}SiO_{1/2})$— (V)

wherein "a" is an integer from 0 to 50, "b" is an integer from 1 to 50, and $R^2$ to $R^{14}$ are independently at each occurrence a hydrogen atom, a $C_1$-$C_{30}$ aliphatic radical, a $C_3$-$C_{30}$ aromatic radical, or a $C_3$-$C_{30}$ cycloaliphatic radical. Aliphatic radical is defined hereinabove. Aliphatic radical and aromatic radical may be defined as the following:

An aromatic radical is an array of atoms having a valence of at least one and having at least one aromatic group. This may include heteroatoms such as nitrogen, sulfur, selenium, silicon and oxygen, or may be composed exclusively of carbon and hydrogen. Suitable aromatic radicals may include phenyl, pyridyl, furanyl, thienyl, naphthyl, phenylene, and biphenyl radicals. The aromatic group may be a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthracenyl groups (n=3) and the like. The aromatic radical also may include non-aromatic components. For example, a benzyl group may be an aromatic radical, which includes a phenyl ring (the aromatic group) and a methylene group (the non-aromatic component). Similarly a tetrahydronaphthyl radical is an aromatic radical comprising an aromatic group ($C_6H_3$) fused to a non-aromatic component —$(CH_2)_4$—. An aromatic radical may include one or more functional groups, such as alkyl groups, alkenyl groups, alkynyl groups, haloalkyl groups, haloaromatic groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylphenyl radical is a $C_7$ aromatic radical comprising a methyl group, the methyl group being a functional group, which is an alkyl group. Similarly, the 2-nitrophenyl group is a $C_6$ aromatic radical comprising a nitro group, the nitro group being a functional group. Aromatic radicals include halogenated aromatic radicals such as trifluoromethylphenyl, hexafluoroisopropylidenebis(4-phen-1-yloxy) (—$OPhC(CF_3)_2PhO$—), chloromethylphenyl, 3-trifluorovinyl-2-thienyl, 3-trichloromethylphen-1-yl (3-$CCl_3Ph$—), 4-(3-bromoprop-1-yl)phen-1-yl ($BrCH_2CH_2CH_2Ph$—), and the like. Further examples of aromatic radicals include 4-allyloxyphen-1-oxy, 4-aminophen-1-yl ($H_2NPh$—), 3-aminocarbonylphen-1-yl ($NH_2COPh$—), 4-benzoylphen-1-yl, dicyanoisopropylidenebis(4-phen-1-yloxy) (—$OPhC(CN)_2PhO$—), 3-methylphen-1-yl, methylenebis(phen-4-yloxy) (—$OPhCH_2PhO$—), 2-ethylphen-1-yl, phenylethenyl, 3-formyl-2-thienyl, 2-hexyl-5-furanyl; hexamethylene-1,6-bis(phen-4-yloxy) (—$OPh(CH_2)_6PhO$—), 4-hydroxymethylphen-1-yl (4-$HOCH_2Ph$—), 4-mercaptomethylphen-1-yl (4-$HSCH_2Ph$—), 4-methylthiophen-1-yl (4-$CH_3SPh$—), 3-methoxyphen-1-yl, 2-methoxycarbonylphen-1-yloxy (e.g., methyl salicyl), 2-nitromethylphen-1-yl (—$PhCH_2NO_2$), 3-trimethylsilylphen-1-yl, 4-t-butyldimethylsilylphenl-1-yl, 4-vinylphen-1-yl, vinylidenebis(phenyl), and the like. The term "a $C_3$-$C_{30}$ aromatic radical" includes aromatic radicals containing at least three but no more than 30 carbon atoms. The aromatic radical 1-imidazolyl ($C_3H_2N_2$—) represents a $C_3$ aromatic radical. The benzyl radical ($C_7H_7$—) represents a $C_7$ aromatic radical.

A cycloaliphatic radical is a radical having a valence of at least one, and having an array of atoms, which is cyclic but which is not aromatic. A cycloaliphatic radical may include one or more non-cyclic components. For example, a cyclohexylmethyl group ($C_6H_{11}CH_2$—) is a cycloaliphatic radical, which includes a cyclohexyl ring (the array of atoms, which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. A cycloaliphatic radical may include one or more functional groups, such as alkyl groups, alkenyl groups, alkynyl groups, halo alkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups and the like. For example, the 4-methylcyclopent-1-yl radical is a $C_6$ cycloaliphatic radical comprising a methyl group, the methyl group being a functional group, which is an alkyl group. Similarly, the 2-nitrocyclobut-1-yl radical is a $C_4$ cycloaliphatic radical comprising a nitro group, the nitro group being a functional group. A cycloaliphatic radical may include one or more halogen atoms, which may be the same or different. Halogen atoms include, for example, fluorine, chlorine, bromine, and iodine. Cycloaliphatic radicals having one or more halogen atoms include 2-trifluoromethylcyclohex-1-yl, 4-bromodifluoromethylcyclooct-1-yl, 2-chlorodifluoromethylcyclohex-1-yl, hexafluoroisopropylidene 2,2-bis(cyclohex-4-yl) (—$C_6H^{10}C(CF_3)_2C_6H_{10}$—), 2-chloromethylcyclohex-1-yl; 3-difluoromethylenecyclohex-1-yl; 4-trichloromethylcyclohex-1-yloxy, 4-bromodichloromethylcyclohex-1-ylthio, 2-bromoethylcyclopent-1-yl, 2-bromopropylcyclohex-1-yloxy (e.g. $CH_3CHBrCH_2C_6H_{10}$—), and the like. Further examples of cycloaliphatic radicals include 4-allyloxycyclohex-1-yl, 4-aminocyclohex-1-yl ($H_2C_6H_{10}$—), 4-aminocarbonylcyclopent-1-yl ($NH_2COC_5H_8$—), 4-acetyloxycyclohex-1-yl, 2,2-dicyanoisopropylidenebis(cyclohex-4-yloxy) $OC_6H_{10}C(CN)_2C_6H_{10}$—), 3-methylcyclohex-1-yl, methylenebis(cyclohex-4-yloxy) (—$OC_6H_{10}CH_2C_6H_{10}$—), 1-ethylcyclobut-1-yl, cyclopropylethenyl, 3-formyl-2-terahydrofuranyl, 2-hexyl-5-tetrahydrofuranyl; hexamethylene-1,6-bis(cyclohex-4-yloxy) (—$OC_6H_{10}(CH_2)_6C_6H_{10}$—); 4-hydroxymethylcyclohex-1-yl (4-$HOCH_2C_6H_{10}$—), 4-mercaptomethylcyclohex-1-yl (4-$HSCH_2C_6H_{10}$—), 4-methylthiocyclohex-1-yl (4-$CH_3SC_6H_{10}O$—), 4-methoxycyclohex-1-yl, 2-methoxycarbonylcyclohex-1-yloxy(2-$CH_3OCOC_6H_{10}O$—), 4-nitromethylcyclohex-1-yl ($NO_2CH_2C_6H_{10}$—), 3-trimethylsilylcyclohex-1-yl, 2-t-butyldimethylsilylcyclopent-1-yl, 4-trimethoxysilylethylcyclohex-1-yl (e.g. $(CH_3O)_3SiCH_2CH_2C_6H_{10}$—), 4-vinylcyclohexen-1-yl, vinylidenebis(cyclohexyl), and the like. The term "a $C_3$-$C_{30}$ cycloaliphatic radical" includes cycloaliphatic radicals containing at least three but no more than 10 carbon atoms. The cycloaliphatic radical 2-tetrahydrofuranyl ($C_4H_7O$—) represents a $C_4$ cycloaliphatic radical. The cyclohexylmethyl radical ($C_6H_{11}CH_2$—) represents a $C_7$ cycloaliphatic radical.

In one embodiment, the organosiloxane group may have a structure of formula (VI).

$$((CH_3)_3SiO_{1/2})_2(CH_3SiO_{2/2})— \qquad (VI)$$

Structure (VI) falls within generic organosiloxane of formula (IV) and represents the case where "a" in structure (IV) is 0 and $R^2$, $R^3$, $R^4$ and $R^7$ are each a methyl radical. In one embodiment, the organosiloxane group may have a structure of formula (VII).

$$((CH_3)_3SiO_{1/2})((CH_3)_2SiO_{2/2})((CH_3)_2SiO_{1/2})— \qquad (VII)$$

Structure (VII) falls within generic organosiloxane of formula (V) and represents the case where "b" in structure (V) is I and $R^8$, $R^9$, $R^{10}$, $R^{11}$, $R^{12}$, $R^{13}$ and $R^{14}$ are each a methyl radical.

Suitable organosilane groups may have a structure of formula (VIII), (IX), (X) or (XI).

$$(R^{15}R^{16}R^{17}Si)_2(R^{18}R^{19}Si)_a(R^{20}Si)— \qquad (VIII)$$

$$(R^{21}R^{22}R^{23}Si)(R^{24}R^{25}Si)_b(R^{26}R^{27}Si)— \qquad (IX)$$

$$(R^{28}R^{29}R^{30}Si)_2(CR^{31}R^{32})_a(R^{33}Si)— \qquad (X)$$

$$(R^{34}R^{35}R^{36}Si)(CR^{37}R^{38})_b(R^{39}R^{40}Si)— \qquad (XI)$$

wherein "a" is independently at each occurrence an integer from 0 to 50, "b" is independently at each occurrence an integer from 1 to 50, and $R^{15}$ to $R^{40}$ are independently at each occurrence a hydrogen atom, a $C_1$-$C_{30}$ aliphatic radical, a $C_3$-$C_{30}$ aromatic radical, or a $C_3$-$C_{30}$ cycloaliphatic radical.

In one embodiment, the organosilane group may have a structure of formula (XII).

$$((CH_3)_3Si)_2(CH_3Si)— \qquad (XII)$$

Structure (XII) falls within generic organosilane group of formula (VIII) and represents the case where "a" in structure (VIII) is 0 and $R^{15}$, $R^{16}$, $R^{17}$ and $R^{20}$ are each a methyl radical. In one embodiment, the organosilane group may have a structure of formula (XIII).

$$((CH_3)_3Si)((CH_3)_2Si)((CH_3)_2Si)— \qquad (XIII)$$

Structure (XIII) falls within generic organosilane group of formula (IX) and represents the case where "b" in structure (IX) is 1 and $R^{21}$, $R^{22}$, $R^{23}$, $R^{24}$, $R^{25}$, $R^{26}$ and $R^{27}$ are each a methyl radical. In one embodiment, the organosilane group may have a structure of formula (XIV).

$$((CH_3)_3Si)_2(CH_2)_2(CH_3Si)— \qquad (XIV)$$

Structure (XIV) falls within generic organosilane group of formula (X) and represents the case where "a" in structure X is 2; $R^{28}$, $R^{29}$, $R^{30}$ and $R^{33}$ are each a methyl radical; and $R^{31}$ and $R^{32}$ are each a hydrogen atom. In one embodiment, the organosilane group may have a structure of formula (XV).

$$((CH_3)_3Si)(CH_2)_2((CH_3)_2Si)— \qquad (XV)$$

Structure (XV) falls within generic organosilane group formula XI and represents the case where "b" in structure XI is 2; $R^{34}$, $R^{35}$, $R^{36}$, $R^{39}$ and $R^{40}$ are each a methyl radical; and $R^{37}$ and $R^{38}$ are each a hydrogen atom.

In one embodiment, the first hydrophobic moiety and the second hydrophobic moiety may be organosiloxane groups, both represented by the structure (VI). In one embodiment, the first hydrophobic moiety may be an organosilane group represented by the structure (XII) and the second hydrophobic moiety may be an organosilane group represented by the structure (XIV). In one embodiment, the first hydrophobic moiety may be an organosiloxane group represented by the structure (VII) and the second hydrophobic moiety may be an organosilane group represented by the structure (XV).

The composition including Gemini surfactants may be characterized one or more of hydrophobic/lipophobic balance (HLB), calorimetry, conductometry, electron spin resonance (ESR) spectroscopy, gonlometry, microscopy, light scattering, neutron scattering, nuclear magnetic resonance (NMR) spectroscopy, rheometry, spectrophotometry, tensiometry, gas chromatography, atomic absorption spectroscopy, infra red (IR) spectroscopy, and the like. Suitable properties that may be determined by one of these techniques may include one or more of hydrolytic stability, spreading properties, aggregation formation and structure, surface activity, solubilization, adsorption, wetting, foaming, phase behavior, flow, and thermotropic properties.

The hydrolytic stability of the composition may be determined at a pH in a range from about 2 to about 10, and at a temperature of 25 degrees Celsius for a time period greater than 24 hours. In one embodiment, the composition may be stable at a pH in a range from about 2 to about 4, from about 4 to about 6, or from about 6 to about 7, at a temperature of 25 degrees Celsius for a time period greater than 24 hours. In one embodiment, the composition may be stable at a pH in a range from about 7 to about 8, from about 8 to about 9, or from about 9 to about 10, at a temperature of 25 degrees Celsius for a time period greater than 24 hours. Here and throughout the specification and claims, range limitations may be combined and/or interchanged. Such ranges as identified include all the sub-ranges contained therein unless context or language indicates otherwise. One or both of the first hydrophobic moiety or the second hydrophobic moiety may provide steric hindrance to the spacer to protect it from hydrolysis.

The super-spreading properties of the composition may be determined for an aqueous solution of the Gemini surfactant composition to provide total wetting as measured by a contact angle on a hydrophobic surface. In one embodiment, an aqueous solution of the composition may be super-spreading at a concentration greater than about 0.1 weight percent. In one embodiment, an aqueous solution of the composition may be super-spreading at a concentration in a range from about 0.1 weight percent to about 0.5 weight percent, from about 0.5 weight percent to about 1 weight percent, from about 1 weight percent to about 2 weight percent, from about 2 weight percent to about 3.5 weight percent, or from about 3.5 weight percent to about 5 weight percent. In one embodiment, an aqueous solution of the composition may be super-spreading at a concentration greater than about 5 weight percent. In one embodiment, a 10 microliter (μL) drop of an aqueous solution of the composition of concentration greater than about 0.1 weight percent may spread to a diameter of about 5 to about 6, of about 6 to about 7, of about 7 to about 8, or of about 8 to about 9 times or greater than a 10 microliter drop of distilled water on the same hydrophobic surface; the diameter being measured at 30 seconds or at 120 seconds after application of the drop to the surface.

The critical aggregation concentration (CAC) of an aqueous solution of the composition may be the concentration above which monomeric surfactant molecules of the composition abruptly form aggregates. In one embodiment, the composition may have an aqueous critical aggregation concentration greater than about 0.001 mM. In one embodiment, the composition may have an aqueous critical aggregation concentration in a range from about 0.001 mM to about 0.01 mM, from about 0.01 mM to about 0.1 mM, from about 0.1 mM to about 1 mM, from about 1 mM to about 10 mM, or from about 10 mM to about 100 mM.

The surface tension of an aqueous solution of the composition of a concentration greater than about 0.1 weight percent may be in a range from about 10 mN/m to about 40 mN/m. In one embodiment, the composition may have an aqueous surface tension in a range from about 10 mN/m to about 20 mN/m, from about 20 mN/m to about 30 mN/m, or from about 30 mN/m to about 40 mN/m.

The invention also includes embodiments that relate to a method of linking a first hydrophobic moiety to a second hydrophobic moiety by using a spacer to form a surfactant. In one embodiment, a bifunctional spacer may be linked to the first hydrophobic moiety and the second hydrophobic moiety simultaneously. In one embodiment, a bifunctional spacer may be first linked to the first hydrophobic moiety, and subsequently linked to the second hydrophobic moiety. In one embodiment, an initially monofunctional spacer may be linked to the first hydrophobic moiety, subsequently functionalized, and linked to the second hydrophobic moiety. Linking of spacer to the hydrophobic moiety may occur by hydrosilylation reaction of a silicon hydride-containing organosiloxane group or organosilane group and a spacer having unsaturated carbon-carbon bonds.

Hydrosilylation reaction may be catalyzed by use of hydrosilylation catalysts. Suitable hydrosilylation catalysts may include one or more of rhodium, platinum, palladium, nickel, rhenium, ruthenium, osmium, copper, cobalt or iron. Suitable platinum catalysts may be used for the hydrosilylation reaction. A suitable platinum compound may have the formula $(PtCl_2Olefin)$ or $H(PtCl_3Olefin)$. Another suitable platinum catalyst may include a cyclopropane complex or a complex formed from chloroplatinic acid with up to 2 moles per gram of platinum and one or more of alcohols, ethers, or aldehydes.

In one embodiment, a first hydrophobic moiety and a second hydrophobic moiety having silicon hydride-containing organosiloxane groups or organosilane groups may be linked by a spacer having unsaturated polyoxyalkylene derivatives by using a hydrosilylation catalyst. In one embodiment, two trimethylsiloxanes represented by structure XI may be linked by hydrosilylation reaction of a silicon hydride containing trimethylsiloxane moiety and an unsaturated polyoxyalkylene derivative, such as a diallyl derivative, in the presence of a platinum catalyst resulting in structure of formula (XVI).

hydrosilylation reaction between the allyl groups in the polyoxyethylene chain and the silicon hydride group. Some other examples of Gemini surfactants exemplifying embodiments of the invention may include structures of formulae (XVII), (XVIII), (XIX), (XX), (XXI) and (XXII).

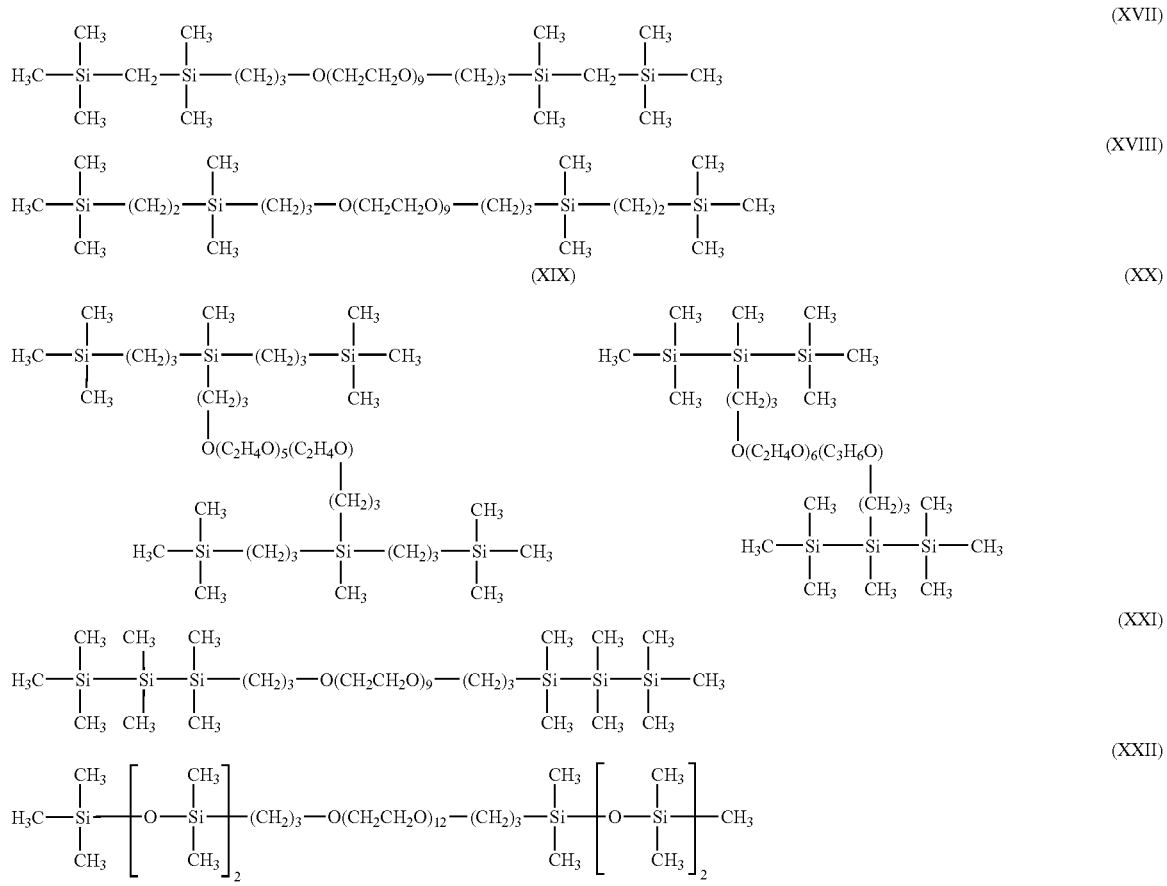

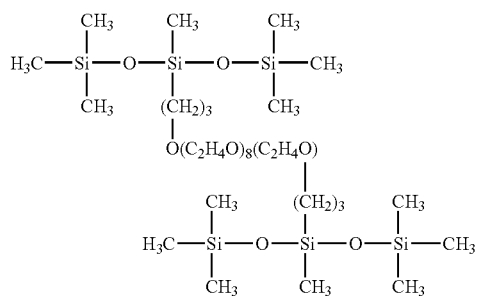

In structure (XVI), the first hydrophobic moiety and the second hydrophobic moiety may be organosiloxanes represented by structure (XI) and the spacer may be a polyether represented by structure (III). The trimethylene linkages linking the polyoxyethylene and the siloxane may result from the The hydrosilylation products of SiH-containing organosiloxanes or SiH-containing organosilanes with unsaturated polyoxyalkylene derivatives may contain excess unsaturated polyoxyalkylene derivative, or be an isomerization product or derivative thereof. The linear ogranosiloxane or linear organosilane derivatives, and their mixtures may contain up to 10 percent weight of cyclic organosiloxane or cyclic organosilane. The hydrosilylation products of SiH-containing organosiloxanes or SiH-containing organosilanes with unsaturated poly alkyleneoxide derivatives may also contain unreacted cyclic organosiloxane or cyclic organosilane.

Polar and/or non-polar solvents may be used with the Gemini surfactant. Examples of suitable polar solvents may include water, alcohols, fatty acids, ketones, glycols, polyethylene glycols, or diols. Examples of suitable non-polar solvents may include aromatic solvents, oils (e.g., mineral oil, vegetable oil, silicone oil, and the like), lower alkyl esters of vegetable oils, or paraffinic low molecular weight waxes.

A polar solvent, such as water, may be added to the Gemini surfactant composition to form an aqueous mixture or an emulsion. The aqueous mixture of the Gemini surfactants may be used to treat a surface, which would otherwise resist the spreading of water subsequent to treating the surface with an effective amount of the surfactant. A coating formulation having the aqueous mixture of the Gemini surfactants may have relatively improved spreading or wetting of the surface.

The concentration of the Gemini surfactant composition in a solution, emulsion, or solid may be in a range of greater than about 0.1 weight percent, based on the weight of the total composition. In one embodiment, the concentration of the Gemini surfactant composition may be in a range from about 0.1 weight percent to about 1 weight percent, from about 1 weight percent to about 2 weight percent, from about 2 weight percent to about 5 weight percent, from about 5 weight percent to about 10 weight percent, from about 10 weight percent to about 25 weight percent, or from about 25 weight percent to about 50 weight percent, based on the weight of the total composition.

Aqueous mixtures of Gemini surfactants may be used as adjuvants; pest control agents or pesticides; flowing and leveling agents; cosmetics; cleaners; detergents; water or fabric softeners; wetting agents; foaming agents; anti-static agents; anti-fogging agents; super-spreading additives; or release agents for adhesives. The Gemini surfactants, and the aqueous mixtures formed therefrom, may have a relatively high flash point (>93° C.) and an extended shelf life. An extended shelf life may be indefinite. A viscosity of an aqueous mixture of one embodiment may be about 50 centipoise at about 20 degrees Celsius. Wetting may be quantified with reference to a cotton skein test, in which the results may be 30 seconds at 0.2 percent mix or 17 seconds at 0.5 percent mix.

The aqueous mixture of the Gemini surfactant may be applied to an agricultural field to act as an adjuvant by improving the wetting properties of the aqueous solutions. A pesticide may be added to the aqueous mixture of the Gemini surfactant. The resulting mixture of the pesticide and the Gemini surfactant may be applied to a plant. The Gemini surfactant may act like an adjuvant and may perform a variety of functions, such as increasing spray droplet retention on difficult to wet leaf surfaces, or may provide penetration of an herbicide into the plant cuticle.

The Gemini surfactant compositions may be used in spray tank mixes, pesticide formulations, adjuvant blends, and in applications where the adjuvant is administered in a sequential addition after the application of a pesticide. The Gemini surfactant composition may be added directly to a spray tank along with the pesticide, or as part of the pesticide formulation ("In Can" or "Ready to Use"). In one embodiment, the application/mixing may occur by simultaneous spraying of the pesticide and of the Gemini surfactant aqueous mixture.

The invention also includes embodiments that relate to a pesticide including a Gemini surfactant composition and one or more of an active ingredient, such as insecticide, rodenticide, fungicide, herbicide, or the like. Illustrative examples of active ingredients include one or more of growth regulators, photosynthesis inhibitors, pigment inhibitors, mitotic disrupters, lipid biosynthesis inhibitors, cell wall inhibitors, and cell membrane disrupters.

Suitable commercially available growth regulators may include one or more of phenoxy acetic acids, such as 2,4-dichlorophenoxyacetic acid; phenoxy propionic acids, such as (RS)-2-(2,4-dichlorophenoxy)propionic acid or (RS)-2-(4-chloro-o-tolyloxy)propionic acid; phenoxy butyric acids, such as 4-(2,4-dichlorophenoxy)butyric acid; benzoic acids, such as 3,6-dichloro-o-anisic acid; or other growth regulators, such as 4-amino-3,5-dichloro-6-fluoro-2-pyridyloxy acetic acid, 4-amino-2,3,5-trichloro-2-carboxylic acid, 3,5,6-trichloro-2-pyridyloxy acetic acid, or 3,6-dichloropyridine-2-carboxylic acid.

Suitable commercially available pigment inhibitors may include one or more of 1H-1,2,4-triazol-3-ylamine; 3-amino-1H-1,2,4-triazole; 2-(2-chlorobenzyl)-4,4-dimethyl-1,2-oxazolidin-3-one; 2-(2-chlorobenzyl)-4,4-methylisoxazolidin-3-one, 1-methyl-3-phenyl-5-(a,a,a-trifluoro-m-tolyl)-4-pyridone, or 4-chloro-5-methylamino-2-(a,a,a-trifluoro-m-tolyl)pyridazin-3(2H)-one.

Suitable commercially available mitotic disruptors may include one or more of dinitroanilines, such as 4-isopropyl-2,6-dinitro-N,N-dipropylaniline, 3,5-dinitro-N4N4-dipropylsulfanilamide, N-(1-ethyl propyl)-2,6-dinitro-3,4-xylidine, 5-dipropylamino-a,a,a-trifluoro-4,6-dinitro-toluidine, 2,6-dinitro-N1N1-dipropyl-4-trifluoromethyl-m-phenylene diamine, or a,a,a-trifluoro-2,6-dinitro-N,N-dipropyl-p-toluidine.

Suitable commercially available lipid biosynthesis inhibitors may include one or more of (±)-2-((E)-3-chloroallyloxy-imino)propyl)-5-(2 (ethylthio)-propyl)-3-hydroxy cyclohex-3-enone, (RS)-2-(4-(2,4-dichlorophenoxy)phenoxy) propionic acid, (±)-2-(4-(6-chloro-1,3-benzoxazol-2-yloxy) phenoxy)propionic acid, (±)-2-(4-(5-chlorobenzoxazol-2-yloxy)phenoxy)propionic acid, (R)-2-(4-(5-trifluoromethyl-2-pyridyloxy)phenoxy)propionic acid, (RS)-2-(4-(3-chloro-5-trifluoro methyl 2-pyridyloxy)phenoxy)propionic acid, (RS)-2(4-(6-chloroquinoxalin-2-yloxy) phenoxy)propionic acid, or (±)-(EZ)-2-(1-ethoxyininobutyl)-5-(2(ethylthio)pro-pyl)-3-hydroxycyclohex-2-enone.

Suitable commercially available photosynthesis inhibitors may include one or more of triazines and s-triazines, such as 3-cyclo-hexyl-6-dimethylamino-1-methyl-1,3,4-triazine-2, 4-(1H,3H) dione, 4-amino-6-tert-butyl-3-methylthio-1,2,3-triazine-5(4H)-one, 6-chloro-N-2-ethyl-N-4-isopropyl-1,3,5-triazine-2,4-diamine, 6-chloro-N2, N4-diethyl-1,3,5-triazine-2,4-diamine, 2-(4-chloro-6-ethylamino-1,3,5-triazin-2-yl) amino-2 methyl propanenitrile, N2,N2 4-diisopropyl-6-methoxy-1,3,5-triazine-2,4-diamine, N2-ethyl-N-4-isopropyl-6-methylthio-1,3,5-triazine-2,4-diamine; substituted ureas, such as 3-(3,4-dichlorophenyl)-1,1-dimethylurea, 1-dimethyl-3-(a,a,a-trifluoro-m-tolyl) urea, 3-(3, 4-dichlorophenyl)-1-methoxy-1-methylurea, 1-(5-tert-butyl-1,3,4-thiadiazol-2-yl)-1,3-dimethylurea; uracils, such as 5-bromo-3-sec-butyl-6-methyluracil or 3-tert-butyl-5-chloro-6-methlyuracil; or other photosynthesis inhibitors, such as 3-isopropyl-1H-2,1,3-benzothiadiazin-4(3H)-one-2, 2-dioxide, ethyl-3'-phenyl carbamoyloxy carbanilate, ethyl 3-phenyl carbamoyloxyphenyl carbamate; 3-ethoxy carbonylamino phenyl carbamate, 2-(3,4-dichlorophenyl)-4-methyl-1,2,4-oxadiazolidine-3,5-dione, 3-(3-methyl carbaniloyloxy)carbanilate, 3-methoxy carbonyl amino phenyl 3'-methyl carbanilate, 3',4'-dichloropropionanilide, or 6-chloro-3-phenyl pyridazin-4-yl S-octyl thiocarbonate.

Suitable commercially available amino acid synthesis inhibitors may include one or more of glycophosphate, sulfate or other salts of N-(phosphonomethyl) glycine; sulfonylureas, such as a-(4,6-dimethoxypy-rimidin-2-yl carbamoyl sulfamoyl)-o-toluic acid, 2-(4-chloro-6-methoxy pyrimidin-2-yl carbamoyl sulfamoyl) benzoic acid, 1-(2-chlorophenyl sulfonyl)-3-(4-methoxy-6-methyl-1,3,5-triazin-2-yl) urea, 2-(4-methoxy-6-methyl-1,3,5-triazin-2-yl carbamoyl sulfamoyl)benzoic acid, 2-(4,6-dimethoxy pyrimidin-2-yl carbamoyl sulfamoyl)-N,N-dimethyl nicotinamide, 1-(4,6-dimethoxy pyrimidinyl)-3-(3-dimethyl carbamoyl-2-pyridyl sulfonyl)urea, 2-(4,6-bis(difluoro methoxy)pyrimidin-2-yl carbamoyl sulfamoyl)benzoic acid, 2-(4,6-dimethylpyrimidin-2-yl carbamoyl sulfamoyl)benzoic acid, 2-(3-(4,6-dimethyl pyrimidin-2-yl)ureido sulfonyl)) benzoic acid, 3-(4-methoxy-6-methyl-1,3,5-triazin-2-yl carbamoyl sulfamoyl)

thiophen-2-carboxylic acid, 1-(2-(2-chloro ethoxy)phenyl sulfonyl)-3(4-methoxy-6-methyl-1,3,5-triazin-2-yl)urea, or 2-(4-methoxy-6-methyl-1,3,5-triazin-2-yl (methyl)carbamoyl sulfamoyl)benzoic acid; or imidazolinones, such as a reaction product comprising (±)-6-(4-isopropyl-4-methyl-5-oxo-2-imidazolin-2-yl)-m-toluic acid and (±)-2-(4-isopropyl-4-methyl-5-ox-2-imidazolin-2-yl)-p-toluic acid, 2-(4-isopropyl-4-methyl-5-oxo-2-imidazolin-2-yl)nicotinic acid, (RS)-2-(4-isopropyl-4-methyl-5-oxo-2-imidazolin-2-yl) quinoline-3-carboxylic acid, or (RS)-5-ethyl-2-(4-isopropyl-4-methyl-5-oxo-2-imidazolin-2-yl)nicotinic acid.

Suitable commercially available cell membrane disruptors may include one or more of bipyridylium compounds, such as 9,10-dihydro-8-diazoniaphenanthrene; 6,7-dihydro dipyrido (1,2-a:2',1-c) pyrazine-5,8-dium; 1,1'-ethylene-2,2'-bipyridyldiylium, or 1,1'-dimethyl-4,4'-bipyridinium(I); diphenylethers, such as A5-(2-chloro-a,a,a-trifluoro-p-tolyoxy)-2-nitrobenzoic acid, 5-(2-chloro-a,a,a-trifluoro-p-tolyloxy)-N-mesyl-2-nitrobenzamide, 5-(2-chloro-a,a,a-trifluoro-p-tolyoxy)-N-methyl sulfonyl-2-nitrobenzamide, 5-(2-chloro-a,a,a-trifluoro-p-tolyloxy)-2-nitrobenzoyl)-DL-lactate, or 2-chloro-a,a,a-trifluoro-p-tolyl-3-ethoxy-4-nitrophenyl ether.

Suitable commercially available cell wall inhibitors may include one or more of 2,6-dichloro benzonitrile, N-(3-(1-ethyl-1-methyl propyl)-1,2-oxazol-5-yl)-2,6-dimethoxy benzamide, or N-(3-(1-ethyl-1-methyl propyl)isoxazol-5-yl)-2,6-dimethoxy benzamide).

The pesticide may be a liquid or a solid. If solid, the active ingredient in the pesticide may be dissolved in a solvent (such as a polar solvent) prior to application, and the Gemini surfactant may act as a surfactant for such solubility, or the Gemini surfactant may act as an emulsifier or as an emulsion stabilizer. The amount of the active ingredient employed in a pesticide according to an embodiment of the invention may vary with, for example, the type of active ingredient employed, the method of application, and the desired end concentration.

Co-adjuvants may be included in the pesticide. Suitable co-adjuvants may include one or more of co-surfactants, stickers, humectants, solvents, oils, drift control agents, buffers, extenders, deposition and retention aids, defoamers, and antifoams, compatibility agents, or herbicide activity enhancers. Herbicide activity enhancers may include ammonium sulfate or nitrogen-containing fertilizers.

Gemini surfactants blends with other surfactants may be used as adjuvants. The blends may be obtained by physically mixing the two components together as a formulation, or by adding them separately to a spray mixture at point of use. A suitable co-surfactant may include one or more nonionic, cationic, anionic, amphoteric, zwitterionic, or polymeric surfactants. Suitable co-surfactants may be hydrocarbon-based, silicone-based or fluorocarbon-based. Suitable co-surfactants may include one or more alkanolamides; alkyl aryl alkoxylates and their derivatives; alkoxylated amines and their derivatives; quaternary ammonium surfactants; alkoxylated quaternary ammonium surfactants and their derivatives; amine oxides; betaines and their derivatives; copolymers containing ethylene oxide, propylene oxide, butylene oxide, styrene oxide or any combination thereof; linear alcohol alkoxylates and their derivatives; branched alcohol alkoxylates and their derivatives; alkoxylated amides; alkoxylated fatty acids; alkoxylated fatty esters and oils; glycerol esters; alkoxylated glycerol esters; imidazolines and their derivatives; propoxylated quaternary amines; lignin and its derivatives (such as lignosulfonate salts); mono- and di-glycerides; olefin sulfonates; phosphate esters; alkyl polyglycosides; other siloxane surfactants, such as alkoxylated siloxanes, alkyl siloxanes, siloxanes containing betaine and quaternary ammonium groups, amino siloxanes, or alkoxylated amino siloxanes; sorbitan esters; ethoxylated sorbitan esters; sulfonate surfactants; sulfosuccinates and their derivatives; salts of fatty acids, or sarcosinates.

In bulk powders that may not have an inherent or a desirable flow character, the Gemini surfactant may be used as an anti-caking, flow aid, slip modifier, and/or flowing agent. The Gemini surfactant may perform one or more of the following functions to affect one or more of the flow-affecting variables listed in Table 1: agglomeration of particles to change size, shape and/or surface texture of particulate, inter-particle interactions for cohesivity and particle interaction, coat particles for decreasing wear, increasing compactability by decreasing surface friction between particles, reducing friction to reduce heat generated by particle flow, affect moisture absorbency of the particulate (increase or decrease depending on choice of hydrophobe moiety), increase electrostatic dissipation, and decrease settling, dust propensity, and/or caking.

TABLE 1

Variables affecting powder flow properties.

| INTRINSIC PROPERTIES | EXTERNAL PROPERTIES |
|---|---|
| Particle size | Compaction condition |
| Size distribution | Temperature |
| Shape | Humidity |
| Surface texture | Electro-static charge |
| Cohesivity | Container surface effects |
| Particle interaction | Storage time |
| Wear or attrition characteristic | |

The Gemini surfactant may be useful as a leveling agent. Leveling agents may be used in cement/concrete (and as an aeration aid), and in paints and coatings. As a leveling agent, the Gemini surfactant may improve the surface properties and the adhesion/wetting of one or more of resins, plastics (particularly composites), solvents and coatings. For coatings, interfacial tension differentials between the coating and the substrate surface may be problematic. Addition of the Gemini surfactant to the coating may reduce the surface tension of the coating to more closely match the surface tension of the substrate surface. In one embodiment, the surface tension, measured in dynes per centimeter, of the coating may be reduced by more than about 50 percent, or about 25 percent, or less than about 10 percent. In one embodiment, the interfacial tension differential of coating/substrate is less than about five dynes per centimeter, is less than about three dynes per centimeter, or less than about one dyne per centimeter.

Gemini surfactants may act as dispersants in coating formulations. That is, the material ingredients in the coating formulations may have reduced or soft settling, enhanced remixability, and extended shelf life. Additions of the Gemini surfactant may affect flow of the coating during application. Increasing the flow may reduce uneven film thickness, orange peel, craters, and/or fat edges. Decreasing the flow may reduce telegraphing, craters, orange peel, and/or picture framing. Decreasing the surface tension may decrease entrapped or entrained air, and may increase the glossiness of the finished coating.

Cosmetics may be formed from Gemini surfactants, and used, for example, in cleaning, conditioning, coloring, moisturizing, and/or styling products. The cosmetics may be used on keratin materials, such as hair or nails, and on the skin. With reference to hair treatment, the cosmetic may facilitate the disentangling of the hair and give it softness and suppleness. The cosmetic may be formed as a hair spray, tonic, gel, mousse, or the like.

Cleansing the skin is very important for facial care. The cosmetic cleanser may be efficient as greasy residues such as excess sebum, the remnants of cosmetic products used daily and make-up products accumulate in the skin folds and can block the pores of the skin and cause the appearance of spots. The cosmetic may be used to cleanse the skin by foaming. The foaming cleansing cosmetic may be in the form of foaming cakes, gels, or creams. Foaming cosmetics may lather to form an unctuous foam (e.g., a smooth, greasy feel); however, tightness due to excessively high detergency may be reduced by selection of hydrophobic moieties. In one embodiment, the cosmetic cleanser may be transparent.

The cleansing cosmetic may include one or more adjuvants used in the cosmetic field, and in particular those used in cleansing products. Suitable adjuvants may include one or more of perfumes, preservatives, sequestrants (e.g., EDTA), pigments, exfoliating fillers, soluble colorants, sunscreens, cosmetic or dermatological active agents such as moisturizers, for instance hyaluronic acid; ceramides; water-soluble or fat-soluble vitamins, for example vitamin C and its derivatives such as vitamin CG; antiseptics; antiseborrhoeic; antimicrobials such as benzoyl peroxide, salicylic acid, triclosan, azelaic acid; optical brighteners. The quantities of these various adjuvants may be in a range of from about 0.01 weight percent to about 25 weight percent of the total weight of the cosmetic composition.

The cosmetic Gemini surfactant-containing composition may be a skin makeup product, such as a complexion product (e.g., foundation), eye shadow, blusher or eyeliner, a concealer product, a body makeup product, or a lip makeup product. For example, the cosmetic may be a foundation, eye shadow, mascara, or blusher. Suitable complexion products may include reflective and/or tinted particles selected from mica substrates, goniochromatic and monochromatic coloring agents, photochromic coloring agents, fluorescent agents, and the like.

Cosmetic complexion products may include a pulverulent base formed from fillers and pigments. Certain fillers, however, such as talc, owing to their opacity to light, may reduce the saturation of the color of the pigments present in the makeup product, with the consequence that the resulting makeup presents an apparent color, which is less vivid than the color of the colorants alone. Other suitable colorants may include relatively more reflective particles, such as metal-coated glass particles, or goniochromatic pigments having a multi-layer interference structure or with a liquid-crystal structure. Goniochromatic pigments may produce colored optical effects, which are original, intense, and different from those obtained with conventional pigments such as iron oxides or titanium dioxide. For cosmetic complexion products other than powder, such as a cream, a gel or a cast product, for example, whether anhydrous or aqueous, the pulverulent materials may be present in an amount of up to about 30 weight percent.

The Gemini surfactant may clean and/or soften a soiled article. Such articles may include hard surfaces or fabrics, and may be porous or impermeable. The Gemini surfactant may be used as an aqueous mixture, or as a mixture of polar liquid and the Gemini surfactant. During cleaning, the Gemini surfactant functions to perform one or more of emulsify oil, hold dirt in suspension, or act as a wetting agent. In one embodiment, the Gemini surfactant may act to disperse biofilm, may disrupt algae or fungal growth, and may passivate reactive surfaces (such as metal rust).

The aqueous mixture of the Gemini surfactant may be foamed, and the foam may be used to extinguish a fire. The fire fighting applications may include house and building fires, fuel or chemical fires, electrical fires, and may include wild fires or forest fires. Foams produced by the Gemini surfactant may have adequate to increased thermal insulation values relative to other commercially available fire foam materials. For use with fuel or chemical fires, the Gemini surfactant foam may emulsify at least a portion of the fuel or chemical to lower the combustibility thereof. The impact of factors such as water hardness, salinity, mix speed, temperature on expansion, and drainage rates may be reduced using the Gemini surfactant relative to other commercially available fire foam materials. The aqueous mixture with the Gemini surfactant can be used at temperatures down to the freezing point of water, and, if frozen, can be thawed and used. Corrosion rates on aluminum, steel and brass are less than those required under U.S. Forest Service specifications. The L.D. 50 value according to industry standard test measurement of Juvenile Trout at 96 hours for a concentrate of the Gemini surfactant: greater than 40 mg per liter; and for a 0.5 weight percent dilution: greater than 8000 mg per liter.

Anti-static/electro-dissipative agents may be produced using the Gemini surfactants. Anti-static agents alter surface properties by reducing the tendency of the surface to acquire an electrical charge.

Anti-fogging agents may be produced using the Gemini surfactants. Below the dew point the air moisture condenses and because of the low-tension surface of polymers this leads to the formation of droplets on a substrate surface. Influencing factors on fogging by moisture deposition may include the difference in temperature between the air and the substrate surface, the level of moisture in the air, and the surface tension of the substrate surface. Because the Gemini surfactants can reduce the surface tension at the substrate surface, a film or deposit that includes Gemini surfactant may reduce fogging.

The examples provided are merely representative of the work that contributes to the teaching of the present application. Accordingly, these examples are not intended to limit the invention, as defined in the appended claims.

EXAMPLES

Unless specified otherwise, ingredients are commercially available from such common chemical suppliers as Aldrich Chemical Company (Milwaukee, Wis.).

Example 1

Preparation of Allyl Capped Polyoxyethylene

Sodium hydride (NaH) is washed with dry hexane three times to remove mineral oil and dried under nitrogen ($N_2$) flow. NaH (4.8 grams, 60 weight percent dispersed in mineral oil) is placed in a three-necked round flask equipped with gas inlet and magnetic stirrer. Dry tetrahydrofuran (THF, 50 milliliters) is charged into the flask. Polyoxyethylene (30 grams, average $M_n$=600) dissolved in 100 milliliters THF is added within 1 hour. The mixture is stirred at room temperature for 3 hours. Allyl bromide (14.4 grams) in 30 milliliters THF is added dropwise within 30 minutes. The mixture is stirred overnight. After filtering off solid and evaporating solvent, allyl-capped polyoxyethylene is obtained.

Example 2

Preparation of Sample 1

Heptamethyl trisiloxane (HMTS, 1.11 grams), the allyl-capped polyoxyethylene (1.79 grams, average $M_n$=600) synthesized in Example 1, and 20 microliters of Pt(0) catalyst are dissolved in 10 milliliters of dry toluene and charged into a 100 milliliters schlenk flask. The mixture is degassed for 3 times and heated to 90 degrees Celsius with magnetic stirring for 2 hours. After cooling to room temperature, the mixture is filtered through diatomite and solvent removed by evaporation, to result in a Gemini surfactant, Sample 1. Sample 1 is straw-colored oil after vacuuming at 90 degrees Celsius for 1 hour.

Example 3

Preparation of Sample 2

Heptamethyl methylene disilane (HMMDS), the allyl-capped polyoxyethylene (average $M_n$=600) synthesized in Example 1, and 20 microliters of Pt(0) catalyst are dissolved in 10 milliliters of dry toluene and charged into a 100 milliliters schlenk flask. The mixture is degassed for 3 times and heated to 90 degrees Celsius with magnetic stirring for 2 hours. After cooling to room temperature, the mixture is filtered through diatomite and solvent removed by evaporation, to result in a Gemini surfactant, Sample 2. Sample 2 is a straw colored oil after vacuuming at 90 degrees Celsius for 1 hour.

Example 4

Preparation of Sample 3

Heptamethyl dimethylene disilane, HMDDS, the allyl-capped polyoxyethylene (average $M_n$=600) synthesized in Example 1, and 20 microliters of Pt(0) catalyst are dissolved in 10 milliliters of dry toluene and charged into a 100 milliliters schlenk flask. The mixture is degassed for 3 times and heated to 90 degrees Celsius with magnetic stirring for 2 hours. After cooling to room temperature, the mixture is filtered through diatomite and solvent removed by evaporation, to result in a Gemini surfactant, Sample 3. Sample 3 is a straw colored oil after vacuuming at 90 degrees Celsius for 1 hour.

Example 5

Test and Results

Portions of each of Samples 1-3 are diluted with distilled water to a first concentration of 0.1 weight percent (Samples 1A-3A), and a second concentration of 0.5 weight percent (Samples 1B-3B). Aliquots (10 microliters) of the aqueous solutions (0.1 weight percent or 0.5 weight percent) of the Gemini surfactants (Samples 1A-3A and Samples 1B-3B), and one aliquot (10 microliter) of distilled water (Comparative Sample 1), are applied to a surface of a polystyrene petri dish. A hygrometer is placed next to the petri dish, and the petri dish is covered with a recrystallization dish. At 30 seconds and at 120 seconds the cover is removed and the perimeter of the droplet is checked and recorded. The spread diameter (in millimeters) of two perpendicular axes is measured 3 times for each sample. The average spread diameter is obtained from the six measured diameters. This test is carried out under controlled relative humidity that is selected to be between 35 percent and 70 percent, and at a temperature in a range of from about 22 degrees Celsius to about 26 degrees Celsius. The spread diameters and the surface tension values obtained are tabulated in Table 2.

TABLE 2

Spreading test results for Samples 1-3 and Comparative Sample 1.

| Sample | Concentration wt % | Spreading diameter (mm) 30 sec | Spreading diameter (mm) 120 sec | Surface Tension (mN/m) |
|---|---|---|---|---|
| 1A | 0.10 | — | 8.8 | 31.54 |
| 1B | 0.50 | — | 17.5 | — |
| 2A | 0.10 | 4 | 13.5 | 32.21 |
| 2B | 0.50 | 22.5 | 26.5 | — |
| 3A | 0.10 | 4 | 6 | 34.44 |
| 3B | 0.50 | 9 | 11 | — |
| Comparative Sample 1 | N/A | 4 | — | 72 * |

* Surface tension of distilled water in mN/m at 25 degrees Celsius from CRC Handbook of Chemistry and Physics; 63 Edition, 1982-1983.

Results tabulated in Table 2 demonstrate that Gemini surfactants of Samples 1-3 have spreading diameters greater than that of pure distilled water of Comparative Sample 1. The surface tension of aqueous solutions of Samples 1-3 is also reduced to less than 35 N/m in comparison to that of aqueous solution of Comparative Sample 1.

The foregoing examples are merely illustrative, serving to illustrate only some of the features of the invention. The appended claims are intended to claim the invention as broadly as it has been conceived and the examples herein presented are illustrative of selected embodiments from a manifold of all possible embodiments. Accordingly it is Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied, those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

The invention claimed is:

1. A composition comprising:
   A first hydrophobic moiety linked to a spacer, which is linked to a second hydrophobic moiety to form a Gemini surfactant, wherein each hydrophobic moiety comprises silicon,
   wherein the first hydrophobic moiety and the second hydrophobic moiety each comprise one or more organosiloxane group or organosilane group, and
   wherein one or both of the first hydrophobic or second hydrophobic moiety comprises an organosiloxane group having a formula (IV), (V), (VIII), (IX), (X), or (XI):

(IV) $(R^2R^3R^4SiO_{1/2})_2(R^5R^6SiO_{2/2})_a(R^7SiO_{2/2}$—
(V) $(R^8R^9R^{10}SiO_{1/2})(R^{11}R^{12}SiO_{2/2})_b(R^{13}R^{14}SiO_{2/2})$—
(VIII) $(R^{15}R^{16}R^{17}Si)_2(R^{18}R^{19}Si)_a(R^{20}Si)$—
(IX) $(R^{21}R^{22}R^{23}Si)(R^{24}R^{25}Si)_b(R^{26}R^{27}Si)$—
(X) $R^{28}R^{29}R^{30}Si)_2(CR^{31}R^{32})_a(R^{33}Si)$—
(XI) $(R^{34}R^{35}R^{36}Si)(CR^{37}R^{38})_b(R^{39}R^{40}Si)$— with $R^2$ to $R^{40}$ independently at each occurrence a hydrogen atom, a $C_1C_{30}$ aliphatic radical, a $C_3$-$C_{30}$ aromatic radical, or a $C_3$-$C_{30}$ cycloaliphatic radical, "a" independently at each occurrence an integer from 0 to 50, "b" an integer from 1 to 50, wherein the spacer comprises one or more of an carboxylic acid group, a sulfonic acid group, a sulfuric acid group, a sulfinic acid group, a phosphonic acid group, a boronic acid group, a fatty acid group, or a fatty acid ester group.

* * * * *